United States Patent [19]

Hosoya et al.

[11] Patent Number: 5,435,129
[45] Date of Patent: Jul. 25, 1995

[54] APPARATUS FOR CONTROLLING AIR FEEDING TO EXHAUST PIPE OF INTERNAL COMBUSTION ENGINE

[75] Inventors: Yasuhiko Hosoya; Toshiki Kuroda, both of Himeji; Hideaki Katashiba, Amagasaki, all of Japan

[73] Assignee: Mitsubishi Denki Kabushiki Kaisha, Tokyo, Japan

[21] Appl. No.: 53,017

[22] Filed: Apr. 27, 1993

[30] Foreign Application Priority Data

Apr. 30, 1992 [JP] Japan .................................. 4-111536

[51] Int. Cl.⁶ ............................................. F01N 3/30
[52] U.S. Cl. ................................... 60/284; 60/289
[58] Field of Search ................... 60/274, 284, 289, 290

[56] References Cited

U.S. PATENT DOCUMENTS

| | | | |
|---|---|---|---|
| 3,503,716 | 3/1970 | Berger | 60/284 |
| 3,962,867 | 6/1976 | Ikeura | 60/290 |
| 4,098,078 | 7/1978 | Laurent | 60/224 |
| 5,163,290 | 11/1992 | Kinnear | 60/284 |

FOREIGN PATENT DOCUMENTS

77018  6/1974  Japan .
32313  1/1975  Japan .
98817  11/1977  Japan .

*Primary Examiner*—Douglas Hart
*Attorney, Agent, or Firm*—Sughrue, Mion, Zinn, Macpeak & Seas

[57] ABSTRACT

In an internal combustion engine equipped with an intake pipe and an exhaust gas purification/discharge system including an exhaust pipe and a catalytic converter installed in the pipe for purification of engine exhaust gas, an apparatus for controlling introduction of air to the exhaust gas purification/discharge system comprises an air feed pipe having one inlet port and an outlet port connected to the exhaust pipe at a position upstream of the catalytic converter, a valve installed in the air feed pipe at a position downstream of the inlet port, and a computerized controller operatively connected to the valve for controlling the valve such that the air introduction to the exhaust gas purification/discharge system is optimized for exhaust gas purification effected by the catalytic converter.

2 Claims, 12 Drawing Sheets

APPARATUS FOR CONTROLLING AIR FEEDING TO EXHAUST PIPE OF INTERNAL COMBUSTION ENGINE

BACKGROUND OF THE INVENTION

1. Field of the Invention

The present invention relates generally to an exhaust gas purification/discharge system for an internal combustion engine. More particularly, the invention is concerned with an apparatus for controlling introduction or feeding of fresh air to an exhaust pipe of an internal combustion engine for promoting purification of engine exhaust gas by catalytic reaction.

2. Description of the Related Art

It is known to introduce or feed fresh air to an exhaust pipe of an internal combustion engine (hereinafter also referred to as the engine) for the purpose of promoting purification of engine exhaust gas through catalytic reaction. For a better understanding of the present invention, the related art will first be discussed in some detail by reference to FIGS. 8 to 13.

Figure 8:
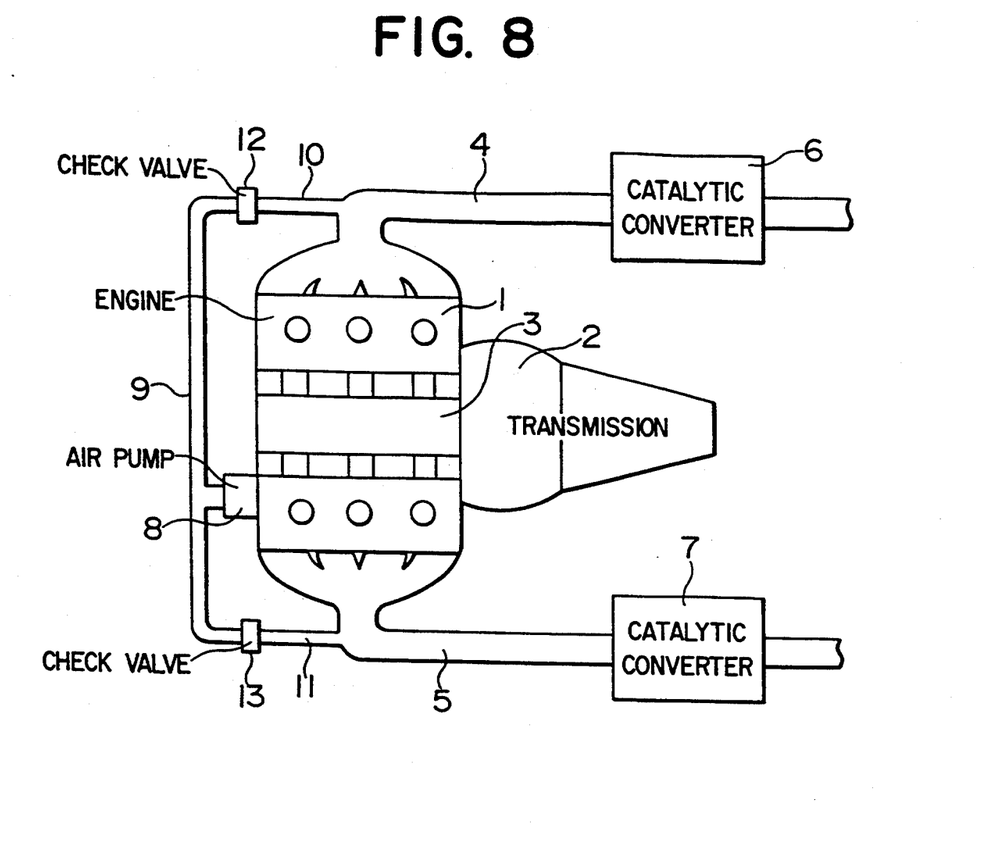
FIG. 8 is a diagram showing schematically an internal combustion engine system known heretofore.

FIG. 8 shows schematically an internal combustion engine system known heretofore. As can be seen in this figure, the engine system is comprised of an internal combustion engine 1, a transmission 2 operatively connected to an output shaft (not shown) of the engine 1, an intake manifold 3 for charging air into the engine 1, two exhaust pipes 4 and 5 for discharging engine exhaust gas, catalytic converters 6 and 7 disposed in the exhaust pipes 4 and 5, respectively, for purifying the exhaust gas through catalytic reaction of carbon monoxide and hydrocarbon contained in the exhaust gas with oxygen contain in the air as introduced, an air pump 8 for taking in and supplying fresh air to the exhaust gas purification/discharge system, a branch pipe 9 for introducing the air taken in through the air pump 8 into the two exhaust pipes 4 and 5 by way of air feed pipes 10 and 11 having inlet ports communicating with the outlet exit ports of the branch pipe 9, and a pair of check valves 12 and 13 installed in the air feed pipes 10 and 11, respectively, for preventing the backward flow of the exhaust gas.

Figure 9:
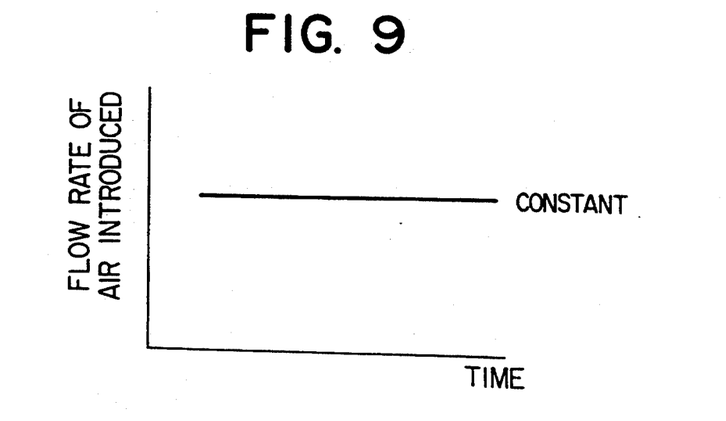
FIG. 9 is a view for graphically illustrating air introduction to an exhaust gas purification/discharge system as a function of time in the known engine system.

In operation, when the engine is started, the air pump 8. operates to feed air constantly to the exhaust pipes 4 and 5 by way of the pipes 9, 10 and 11 at a substantially uniform flow rate, as shown in FIG. 9. The air introduced into the exhaust pipes 4 and 5 flows through the catalytic converters 6 and 7, during which oxygen contained in the air reacts with carbon monoxide and hydrocarbon contained in the exhaust gas to thereby purify the latter.

The air feeding system of the engine shown in FIG. 8 however suffers from a problem that the quantity of flow air introduced into the exhaust pipe can not be controlled to be optimal for the gas purifying operation of the catalytic converters 6 and 7 because the fresh air is supplied constantly at a substantially uniform flow rate.

Figure 10:
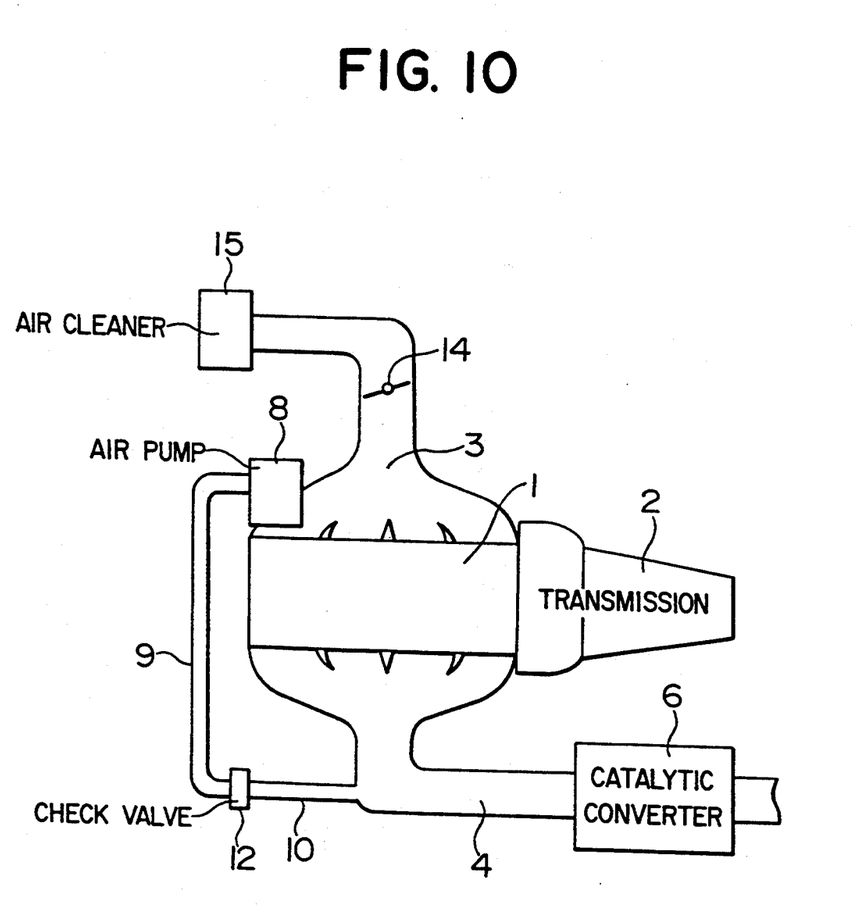
FIG. 10 is a diagram showing schematically a structure of another known engine system equipped with a single exhaust gas purification/discharge system.

FIG. 10 shows schematically a structure of another known engine system equipped with a single exhaust gas purification/discharge system. Referring to the figure, an internal combustion engine 1 is provided with an air intake pipe 3 for charging air into the engine 1, the intake pipe 3 having an inlet port connected to an air cleaner 15 which serves for screening out the dusts or other foreign materials from the air introduced into the intake pipe 3. Mounted within the intake pipe 3 is a throttle valve 14 for adjusting the flow of air charged into the engine 1. An exhaust pipe 4 connected to the engine 1 serves to transport the exhaust gas discharged from the engine 1 to a catalytic converter 6 which is provided for purifying the exhaust gas through the catalytic chemical reaction, as mentioned previously. The intake pipe 3 is connected to the exhaust pipe 4 at a location upstream of the catalytic converter 6 by way of a shunt pipe 9 and an air feed pipe 10 for introducing the air into the exhaust pipe 4 from the intake pipe 3. An air pump 8 is installed in the shunt pipe 9 for feeding the air having passed through the air cleaner 15 into the shunt pipe 9 under pressure. Disposed in the fresh air feed pipe 10 at a position upstream of the exhaust pipe 4 is a check valve 12 for preventing the exhaust gas from flowing backward direction from the exhaust pipe 4 to the intake pipe 3. A transmission 2 is coupled to an output shaft of the engine 1.

In the engine system shown in FIG. 10, the air pump 8 supplies the fresh air at a constant flow rate to the exhaust pipe 4 and hence to the catalytic converter 6, as shown in FIG. 9.

The air feeding system shown in FIG. 10 is disadvantageous in that the quantity of air flow introduced into the exhaust pipe 4 decreases when the exhaust gas pressure within the pipe 4 increases, as a result of which purification efficiency of the catalytic converter 6 is degraded.

Figure 11:
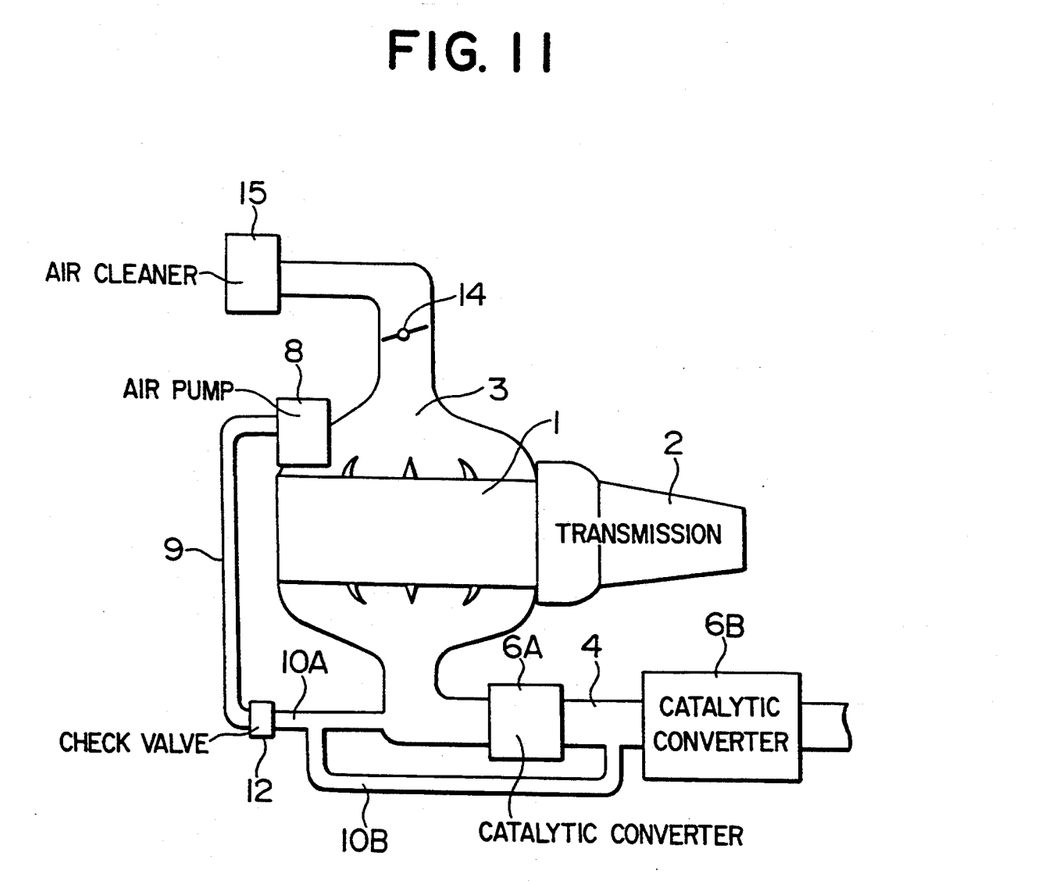
FIG. 11 is a diagram showing schematically a structure of another known engine system equipped with a single exhaust gas discharge system.

In the case of an engine system shown in FIG. 11 which is a modification of that shown in FIG. 10, two catalytic converters, i.e., an auxiliary catalytic converter 6A and a main catalytic converter 6B, are serially installed in the exhaust pipe 4 in this order as viewed in the flow direction of the exhaust gas, wherein a shunt pipe 9 is branched into a first feed pipe 10A connected to the exhaust pipe 4 at a location upstream of the auxiliary catalytic converter 6A and a second feed pipe 10B connected to the exhaust pipe 4 at a location upstream of the main catalytic converter 6B. In this conjunction, it is noted that the auxiliary catalytic converter 6A is usually of a smaller capacity than that of the main catalytic converter 6B so that the former can be activated earlier than the latter.

In operation, the air pump 8 operates in response to the start of the engine to supply the fresh air at a constant flow rate to the exhaust gas discharge system through the shunt pipe 9, as shown in FIG. 9. A part of the air thus introduced flows through the air feed pipe 10A and hence the auxiliary catalytic converter 6A with the other part of air flowing through the air feed pipe 10B and the main catalytic converter 6B for purification of the engine exhaust gas through the catalytic reaction, as mentioned previously. In this engine system, the fresh air is fed to the exhaust gas purification/discharge system at a constant flow rate, as shown in FIG. 9.

The air introduction system of the engine shown in FIG. 11 suffers a problem that the temperature of the exhaust gas within the exhaust pipe 4 as well as that of the catalytic converters 6A and 6B is lowered due to admixture of the fresh air, resulting in that the temperature required for the catalytic reaction is lowered, whereby the exhaust purification efficiency is degraded.

Figure 12:
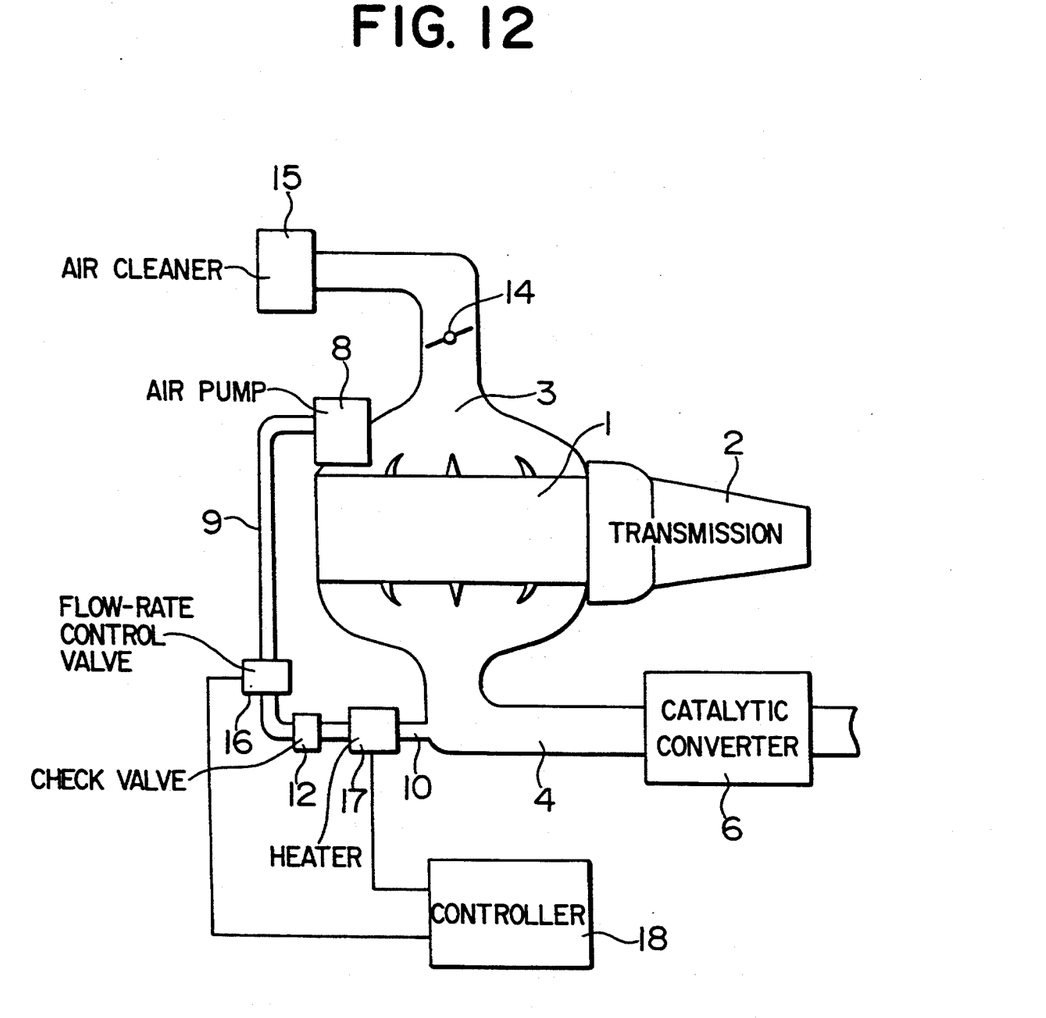
FIG. 12 is a diagram showing schematically a structure of yet another known engine system equipped with a single exhaust gas purification/discharge system.

FIG. 12 shows another modification of the engine system shown in FIG. 10. In the case of the engine system shown in FIG. 12, a control valve 16 is installed between the shunt pipe 9 and the air feed pipe 10 at a location upstream of the check valve 12. Further, an electric heater 17 is disposed in the air feed pipe 10 at a location downstream of the check valve 12. Operation of the control valve 16 and that of the electric heater 17 are controlled by a control unit 18.

Figure 13:
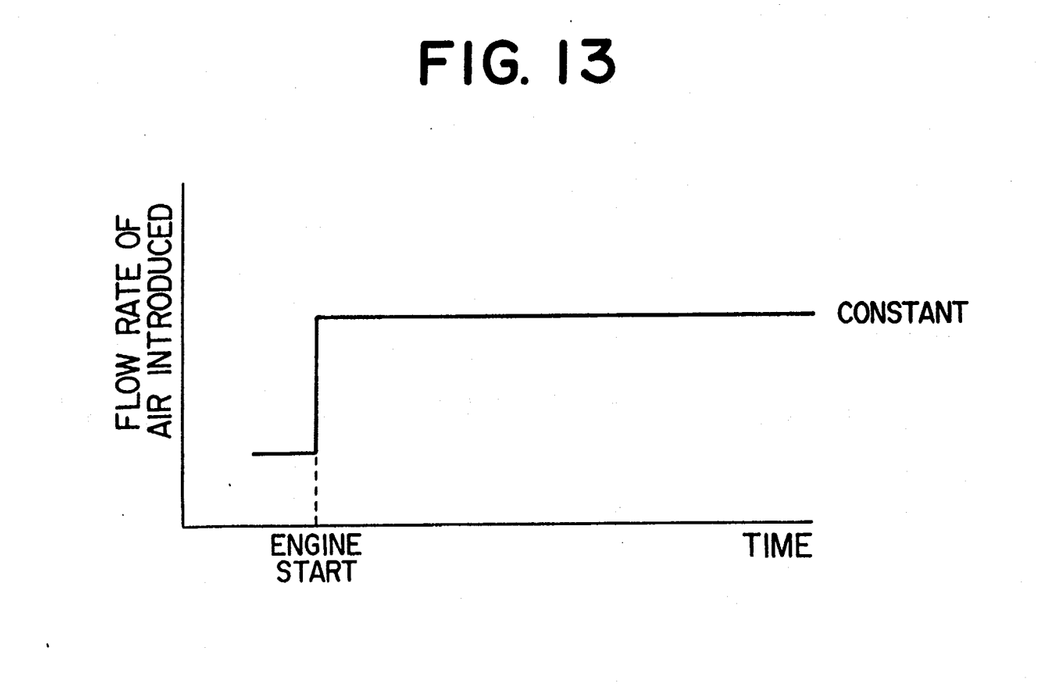
FIG. 13 is a view for graphically illustrating air introduction to an exhaust gas purification/discharge system as a function of time in the system shown in FIG. 12.

Upon starting of the engine 1, the air pump 8 operates to feed air from the intake pipe 3 to the exhaust pipe 4 through the shunt pipe 9, the control valve 16, the check valve 12, the electric heater 17 and the air feed pipe 10. The control valve 16 is actuated simultaneously with the start of engine operation to supply the air to the exhaust gas purification/discharge system at a constant flow rate, as shown in FIG. 13. The air thus introduced into the air feed pipe 10 is heated by the electrical heater 17 an then undergoes reaction with carbon monoxide and hydrocarbon contained in the exhaust gas in the course of flowing through the catalytic converter 6.

In the case of the air introduction system shown in FIG. 12, the problem of the system shown in FIG. 11 can certainly be coped with by providing the heater 17 for heating the air to be fed to the exhaust pipe 4. However, temperature rise of the heater 17 which is electrically energized simultaneously with the start of engine operation is usually accompanied with a considerable time lag. As a result of this, a lot of time is taken for heating the air as introduced to a temperature required for the catalytic reaction, giving rise to a problem that the exhaust gas can not satisfactorily be purified in the initial phase of the engine operation.

SUMMARY OF THE INVENTION

In the light of the state of the art described above, it is an object of the present invention to provide an apparatus for controlling air supplied to an exhaust gas purification/discharge system of an internal combustion engine, which apparatus is substantially immune to the problems of the hitherto known apparatuses and which is capable of controlling the quantity and/or temperature of the air fed to the exhaust gas purification/discharge system to be optimal for the gas purifying operation of the catalytic converter to thereby ensure high efficiency for the purification of the exhaust gas by catalytic chemical reaction.

In view of the above and other objects which will become apparent as description proceeds, there is provided according to as aspect of the present invention which is directed to an internal combustion engine equipped with an intake pipe and a dual exhaust gas discharge/purification system including first and second exhaust pipes extending in parallel with each other and first and second catalytic converters installed for purification of engine exhaust gas in the first and the second exhaust pipes, respectively, an apparatus for controlling introduction of air into the dual exhaust gas purification/discharge system which apparatus comprises an air feed pipe having one inlet port and two outlet ports connected to the first and the second exhaust pipes at positions upstream of the first and second catalytic converters, respectively, a valve means installed in the air feed pipe at a position downstream of the inlet port, and a control means operatively connected to the valve means for controlling the valve means such that the air introduction to the dual exhaust Gas discharge/purification system is changed over between the first and the second exhaust pipes alternately, while controlling the quantity of air fed to the exhaust pipes, to thereby optimize exhaust gas purification effected by the first and the second catalytic converters.

With the structure of the fresh air introduction control apparatus describe above, the quantity of air introduced into the exhaust pipes and the catalytic converters can be controlled to be optimal for the gas purification capabilities of both catalytic converters by controlling the timing at which the air introduction is changed over between the first and the second exhaust pipe.

According to another aspect of the invention, there may further be provided for the air introduction control apparatus described above an electric heater means which is installed in the air feed pipe at positions upstream of the exhaust pipes, respectively, for heating the air flow fed to the exhaust gas pipes under the control of the control means.

By virtue of the above arrangement, the temperature of the air fed to the exhaust gas purification/discharge system can be risen to a level which is optimal for the catalytic reaction, whereby a high efficient gas purification can be realized.

Further, according to yet another aspect of the invention which is directed to an internal combustion engine equipped with an intake pipe and an exhaust gas purification/discharge system including an exhaust pipe and a catalytic converter installed in the exhaust pipe for purification of engine exhaust gas, there is provided an apparatus for controlling introduction of air into the exhaust gas discharge system, which apparatus comprises an air feed pipe having an inlet port and an outlet port which is connected to the exhaust pipe at a position upstream of the catalytic converter, a valve means installed in the air feed pipe at a position downstream of the inlet port, a pressure sensor means for detecting pressure of exhaust gas in the exhaust pipe, and a control means operatively connected to the valve means for controlling it in dependence on the exhaust gas pressure detected by the pressure sensor such that the quantity of air fed to the exhaust pipe and hence to the catalytic converter is optimized for exhaust gas purification effected by the catalytic converter.

With the structure of the air introduction apparatus described above, the problem of the known engine system described hereinbefore in conjunction with FIG. 10 can satisfactorily be solved.

According to a further aspect of the invention which is directed to an internal combustion engine equipped with an intake pipe and an exhaust gas purification/discharge system, wherein the exhaust gas purification/discharge system includes an exhaust pipe and first and second catalytic converters installed in the exhaust pipe serially in this order as viewed in the flow direction of exhaust gas for purification thereof, there is provided an apparatus for controlling introduction of air into the exhaust gas purification/discharge system, which apparatus comprises an intake means for taking in air to be introduced to the exhaust gas purification/discharge system, a first air feed pipe branching from the air intake means for introducing air to the exhaust pipe at a location upstream of the first catalytic converter, a second air feed pipe branching from the air intake means for introducing air to the exhaust pipe at a location upstream of the second catalytic converter, a valve means installed between the air intake means and the first and the second air feed pipes, and a control means operatively connected to the valve means for controlling it such that the air introduction to the exhaust pipe is changed over between the first and the second air feed pipes alternately, while controlling the quantity of air fed to the first and the second air feed pipes such that the exhaust gas purification effected by the first and the second catalytic converters can be optimized.

Owing to the air introduction control apparatus of the structure described above, the quantity of air introduced to the first or auxiliary catalytic converter and the second or main catalytic converter alternately can be optimized for the gas purifying operation thereof by controlling appropriately the timing at which the air feeding is changed over between the auxiliary and the main catalytic converters.

In the apparatus described just above, there may be provided first and the second electric heater means installed in the first and second air feed pipes at positions downstream of the valve means and upstream of the first and the second catalytic converters, respectively, for heating the air flows directed to the first and the second catalytic converters under the control of the control means.

By providing the electric heaters in the manner mentioned above, temperature of the air to be introduced to the catalytic converters can be risen to a level which is optimal for the catalytic reaction, whereby the gas purification efficiency can significantly be enhanced.

According to a still further aspect of the invention which is directed to an internal combustion engine equipped with an intake pipe and an exhaust gas purification/discharge system including an exhaust pipe and a catalytic converter installed in the exhaust pipe for purification of engine exhaust gas, there is provided an apparatus for controlling introduction of air into the exhaust gas purification/discharge system, which apparatus comprises an air feed pipe having an inlet port and an outlet port which is connected to the exhaust pipe at a position upstream of the catalytic converter, an electrically controllable valve means installed in the air feed pipe at a position downstream of the inlet port for controlling air flow fed to the exhaust gas purification/discharge system, an electrical heater means disposed in the air feed pipe at a position downstream of the electrically controllable valve means and upstream of the catalytic converter, power supply means for supplying electric power required for operation of the engine, the valve means and the heater means, a voltage level detector means for detecting output voltage level of the power supply means, and a control means electrically connected at least to the power supply means, the valve means, the electric heater means and the voltage level detecting means for electrically energizing the heater means upon start of operation of the engine while controlling a timing of operation of the valve means for feeding air to the exhaust gas purification/discharge system via the electric heater means in dependence on the output voltage level of the power supply means as detected by the voltage level detector means.

With the structure of the air introduction control apparatus described above, not only the quantity of air introduced into the exhaust gas purification/discharge system but also temperature thereof can be controlled to be optimal for realization of high efficient and effective gas purification, by taking into account the output power level of an onboard battery serving as the power supply source.

The above and other objects, features and attendant advantages of the present invention will more easily be understood by reading the following description of the preferred embodiments thereof taken in conjunction with the drawings.

DESCRIPTION OF THE PREFERRED EMBODIMENTS

Now, the present invention will be described in detail in conjunction with preferred or exemplary embodiments thereof by reference to the drawings.

Embodiment 1

Figure 1:
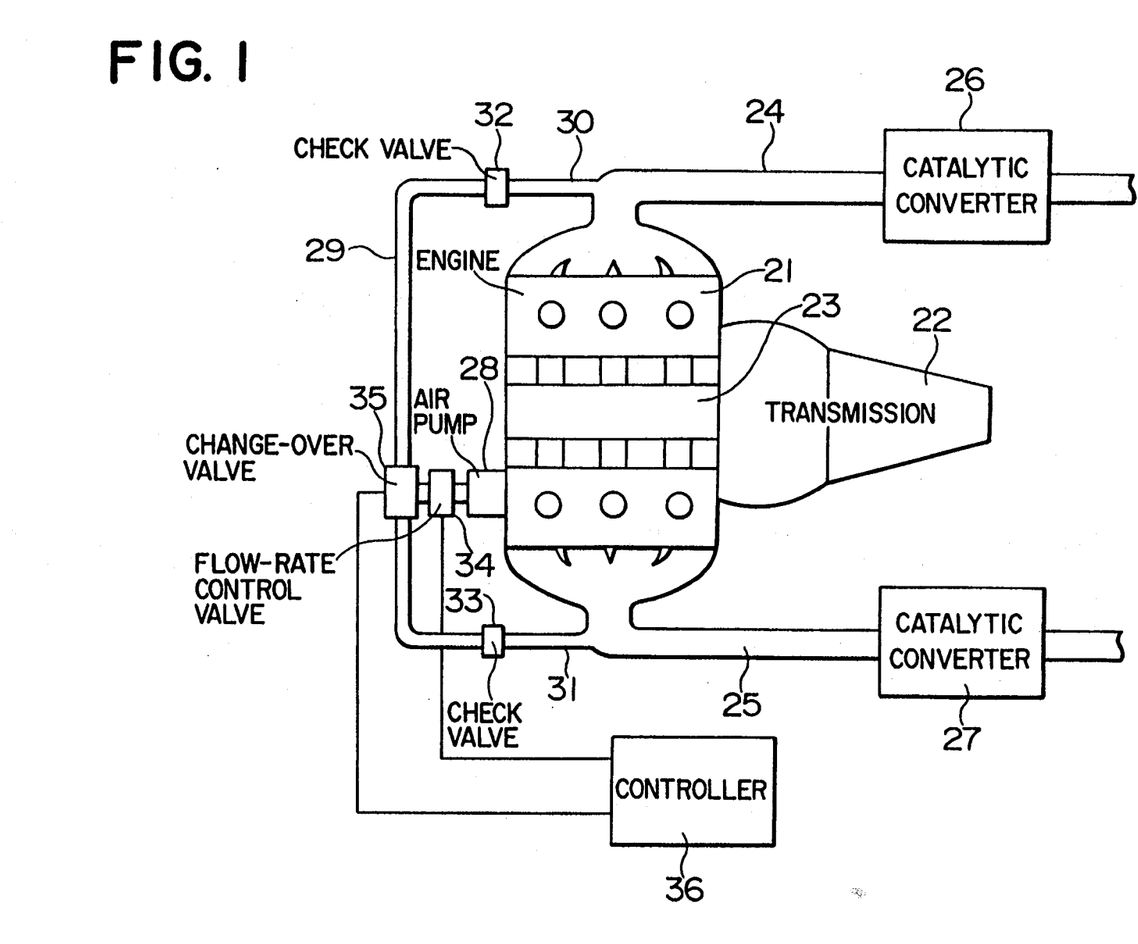
FIG. 1 is a diagram showing schematically a general arrangement of an internal combustion engine system which incorporates an apparatus for controlling introduction of air into a dual exhaust gas purification/discharge system of the engine according to a first embodiment of the invention.

FIG. 1 shows schematically a general arrangement of an internal combustion engine system which is equipped with an apparatus for controlling introduction of fresh air into a dual exhaust gas purification/discharge system according to a first embodiment of the invention. As can be seen in this figure, the engine system is comprised of an internal combustion engine 21, a transmission 22 operatively connected to the engine 21, an intake manifold 23 charging air into the engine 21, two exhaust pipes 24 and 25 extending in parallel with each other for discharging engine exhaust gas, catalytic converters 26 and 27 disposed in the exhaust pipes 24 and 25, respectively, for purifying the exhaust gas, an air pump 28 for taking in ambient or fresh air from the intake manifold 23, a branch pipe 29 for introducing the fresh air taken in through the air pump 28 into the two exhaust pipes 24 and 25 through a pair of air feed pipes 30 and 31 having inlet ports communicating with the exit ports of the branch pipe 29, respectively, and a pair of check valves 32 and 33 installed in the fresh air feed pipes 30 and 31 for preventing backward flow of the exhaust gas, respectively.

Disposed at a location between the air pump 28 and a junction of the branch pipe 29 is a control valve 34 for controlling optimally the air flow supplied from the air pump 28, while a change-over valve 35 is disposed at a location downstream of the control valve 34 for changing over the air feeding to the air feed pipes 30 and 31 alternately, wherein operations of the control valve 34 and the change-over valve 35 are adapted to be controlled by a control unit 36.

Next, description will turn to the operation of the engine system shown in FIG. 1. When the internal combustion engine 21 is started, the air pump 28 feeds the fresh air to the control valve 24 in a quantity which depends on the rotation speed of the engine 21. On the other hand, the control valve 34 supplied the air to the change-over valve 35 while controlling optimally the air flow to be introduced to the exhaust pipes under the control of the control unit 36. The change-over valve 25 changes over the destination of the fresh air flow between the air feed pipes 30 and 31 alternately at an appropriate time interval, for example, in a range of 1 to 10 Hz under the control of the control unit 36, as a result of which the fresh air is introduced into the exhaust pipes 24 and 25 alternately, wherein the fresh air is mixed with the exhaust gas to be supplied to the catalytic converter 26 or 27 for purifying the exhaust gas through catalytic reaction with carbon monoxide and hydrocarbon contained in the exhaust gas in the catalytic converter 26 or 27. In this manner, the change-over valve 35 serves for supplying the controlled air flow alternately to the catalytic converters 26 and 27 to increase and decrease the concentration of the exhaust gas within the catalytic converters 26 and 27 alternately for thereby enhancing the purification efficiency of the catalytic converters 26 and 27 by optimizing the concentration of the exhaust gas for the catalytic reaction within the catalytic converters 26 and 27. The condition for the catalytic reaction differs in dependence on the catalytic converters actually employed. Accordingly, the optimum condition for the reaction is previously determined for the catalytic converter actually employed so that the control valve 34 and the change-over valve 35 can be controlled by the control unit 36 on the basis of the preestablished condition for the reaction. Incidentally, the control operations of the control unit 36 such as mentioned above and below are executed by a microcomputer incorporated in the control 10. However, since such micro-computer is a conventional one, description thereof is omitted, being understood that implementation as well as programming of the microcomputer required for the controls imposed thereon lies within the skill of those having ordinary knowledge in the art.

As can be appreciated from the above description, by virtue of the control concept incarnated in the control apparatus according to the instant embodiment of the invention, the air flow introduced to the two exhaust pipes 24 and 25 is optimized for purification of the exhaust gas by the catalytic converters 26 and 27 by means of the change-over valve 35 and the control valve 34. Thus, the efficiency of purification of the exhaust gas carried out by the catalytic converters 26 and 27 can significantly be enhanced because the concentration of the exhaust gas is so controlled as to be optimal for the gas purifying reaction. Further, the control system as well as the exhaust gas purification system as a whole can be manufactured inexpensively.

Embodiment 2

Figure 2:
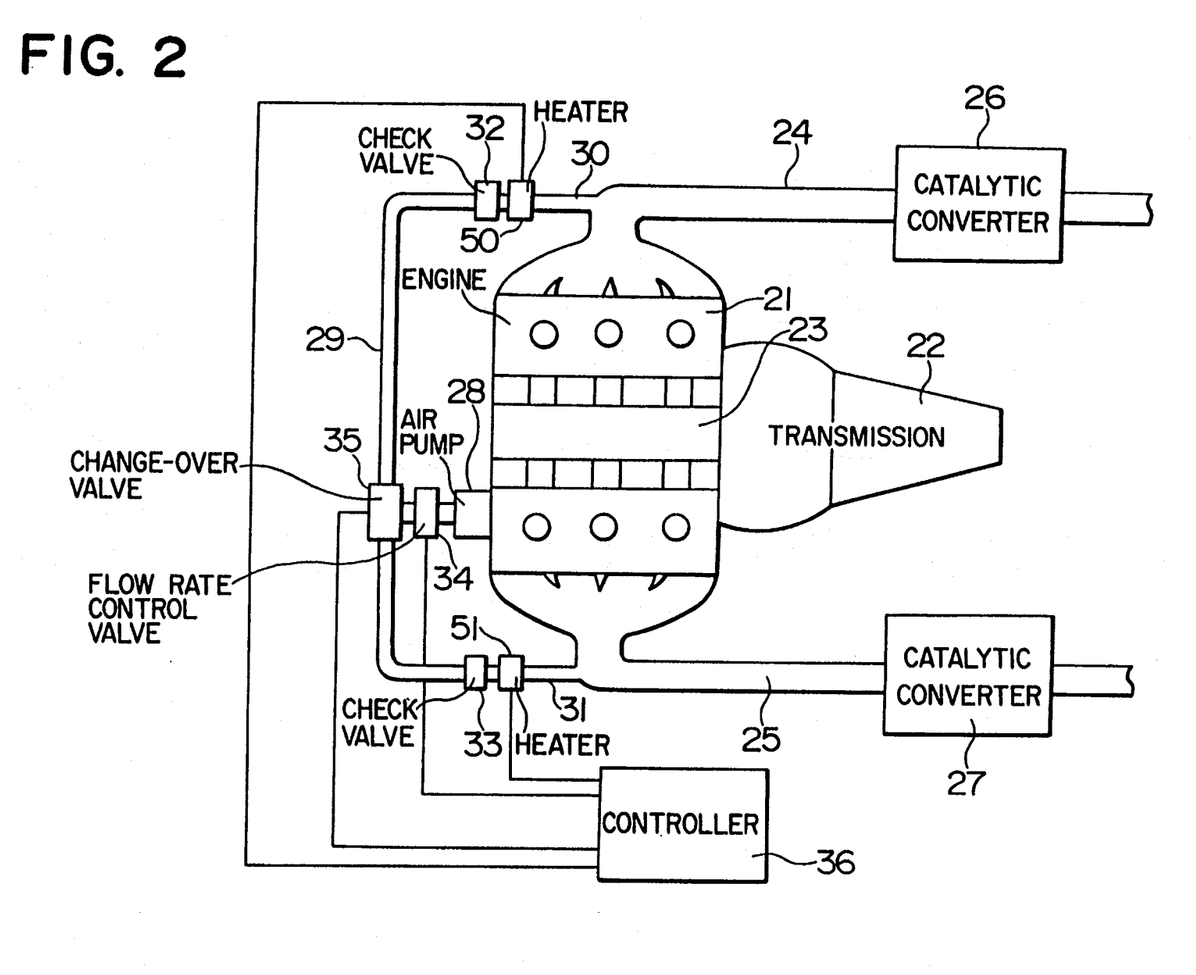
FIG. 2 is a diagram showing schematically a general arrangement of an internal combustion engine system which incorporates an apparatus for controlling introduction of air into two exhaust pipe systems of the engine according to a second embodiment of the invention.

FIG. 2 shows schematically a general arrangement of an internal combustion engine system which includes an apparatus for controlling introduction of fresh air into two exhaust pipe systems of the engine according to a second embodiment of the invention. The engine system according to the instant embodiment of the invention is substantially of a same configuration as that of the first embodiment except that heaters 50 and 51 are disposed in the air feed pipes 30 and 31, respectively.

In operation, the fresh air tapped from the intake manifold 28 is fed to the exhaust pipes 24 and 25 and hence to the catalytic converters 26 and 27 via the pipes 30 and 31 alternately, as described hereinbefore. In that case, the heaters 50 and 51 are actuated in response to a heating control signal generated by the control unit 36, as a result of which the fresh air introduced through the fresh air pipe 30 or 31 and flowing through the heater 50 or 51 is heated to a high temperature. The air thus heated and carrying oxygen molecules activated thereby undergoes reaction with noxious components such as hydrocarbon (HC) and carbon monoxide (CO) contained in the engine exhaust gas with a high efficiency within the catalytic converter 26 or 27, whereby HC and CO are effectively converted to harmless components such as $H_2O$ and $CO_2$. In this way, purification of the exhaust gas can be realized with an enhanced efficiency.

Embodiment 3

Figure 3:
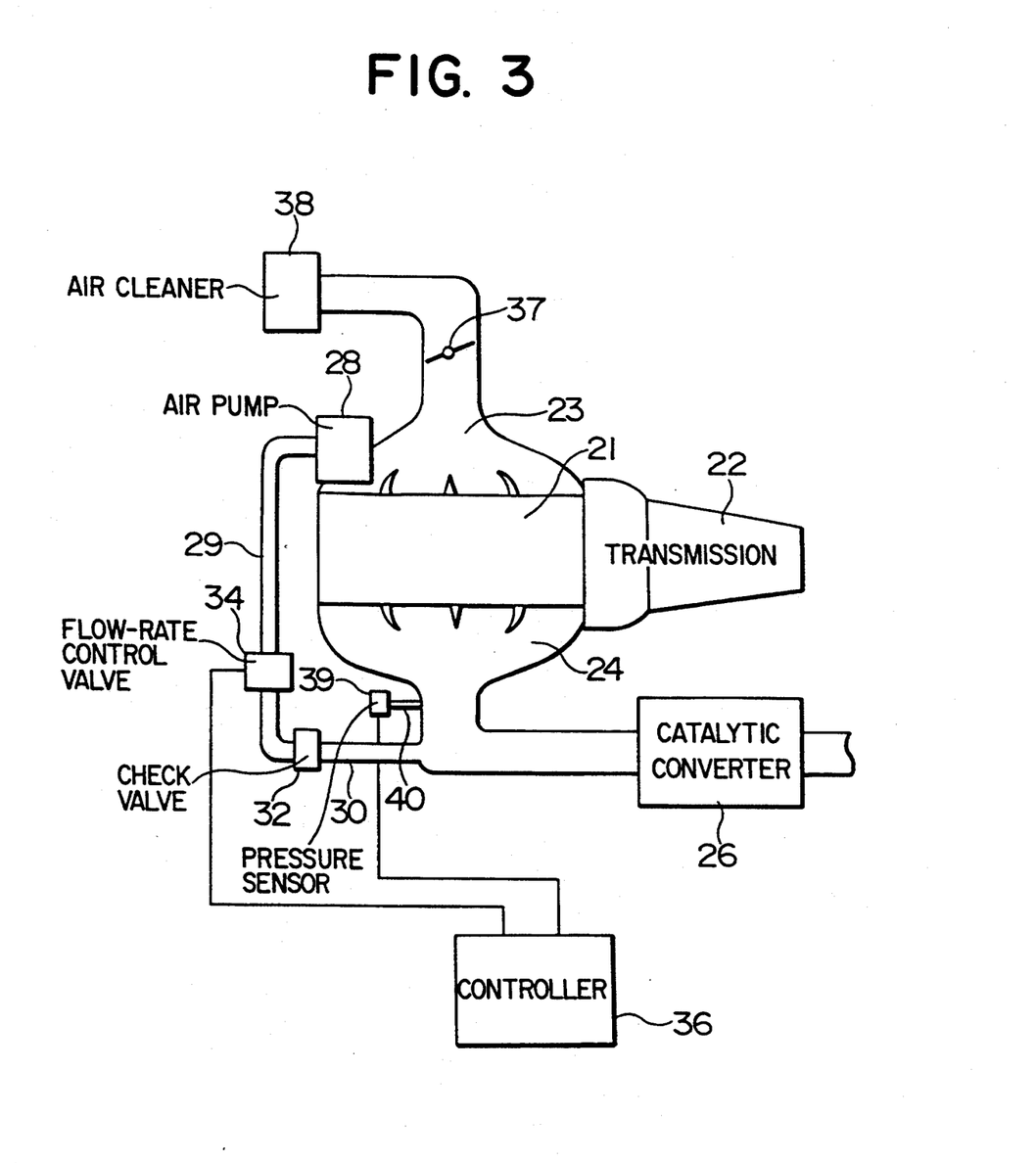
FIG. 3 is a diagram showing schematically a configuration of an internal combustion engine system which is equipped with an apparatus for controlling fresh air introduced into a single exhaust gas purification/discharge system according to a third embodiment of the invention.

FIG. 3 shows schematically a configuration of an internal combustion engine system which is equipped with an apparatus for controlling the air flow introduced into a single exhaust gas purification/discharge system according to a third embodiment of the invention. Referring to the figure, an internal combustion engine 21 is provided with an air intake pipe 23 for supplying air into the engine 21, the intake pipe 23 having an inlet port connected to an air cleaner 38 which serves for screening out the dusts or other foreign materials from the air introduced into the intake pipe 23. Mounted within the intake pipe 23 is a throttle valve 37 for adjusting or regulating the flow or volume of the air charged into the engine 21 by adjusting the degree of opening of that valve. An exhaust pipe 24 connected to the engine 21 serves to transport the exhaust gas discharged from the engine 21 to a catalytic converter 26 which is provided for purifying the exhaust gas through a catalytic chemical reaction. The intake pipe 23 is connected to the exhaust pipe 24 at a location upstream of the catalytic converter 26 by way of a shunt pipe 29 and an air feed pipe 30 for introducing the fresh air into the exhaust pipe 24 from the intake pipe 23. In this conjunction, an air pump 28 is installed in the shunt pipe 29 for forcibly feeding the air having passed through the air cleaner 38 into the shunt pipe 29 under pressure. Disposed in the air feed pipe 30 at a position upstream of the exhaust pipe 24 is a check valve 32 which functions to prevent the exhaust gas from flowing backwardly from the exhaust pipe 24 toward the intake pipe 23. A transmission 22 is coupled to an output shaft (not shown) of the engine 21.

A pressure sensor 39 is operatively connected to the exhaust pipe 24 through a conduit 40 for detecting the pressure of the exhaust gas within the exhaust pipe 24. Further, a control valve 34 is installed in the shunt pipe 29 at a position upstream of the check valve 32. The pressure sensor 39 and the control valve 34 are electrically connected to a control unit 36 which is designed or programmed to control operation of the control valve 34 on the basis of the detection signal outputted from the pressure sensor 39. Parenthetically, the quantity of air to be charged into the engine differs in dependence on the performance or output capability of the engine. Accordingly, the quantity of air flow to be introduced to the exhaust pipe 24 under the control of the control valve 34 is previously set to be optimal for the engine in consideration of the performance thereof.

In operation of the engine system described above, when the internal combustion engine 21 is started, the air pump 28 actuated in response to rotation of the engine 21 introduces the air to the control valve 34 through the shunt pipe 29. On the other hand, the pressure sensor 39 detects the pressure of the exhaust gas within the exhaust pipe 24 through the conduit 40, the output signal of the pressure sensor 29 being supplied to the control unit 36. In response to the pressure detection signal supplied from the pressure sensor 39, the control unit 36 controls the control valve 34 so that the fresh air can be introduced into the exhaust pipe 24 in a quantity which is optimal for the purification of the exhaust gas performed by the catalytic converter 26 at the exhaust gas pressure prevailing within the exhaust pipe 24 and detected by the pressure sensor 39. As a modification of the instant embodiment, the mechanical air pump 28 may be replaced by an electrical air pump. In that case, an electric motor constituting a part of the electrical air pump may be controlled in dependence on the exhaust gas pressure to thereby control the quantity of air flow introduced into the exhaust pipe 24 so that optimal purification reaction can take place in the catalytic converter 26.

Embodiment 4

Figure 4:
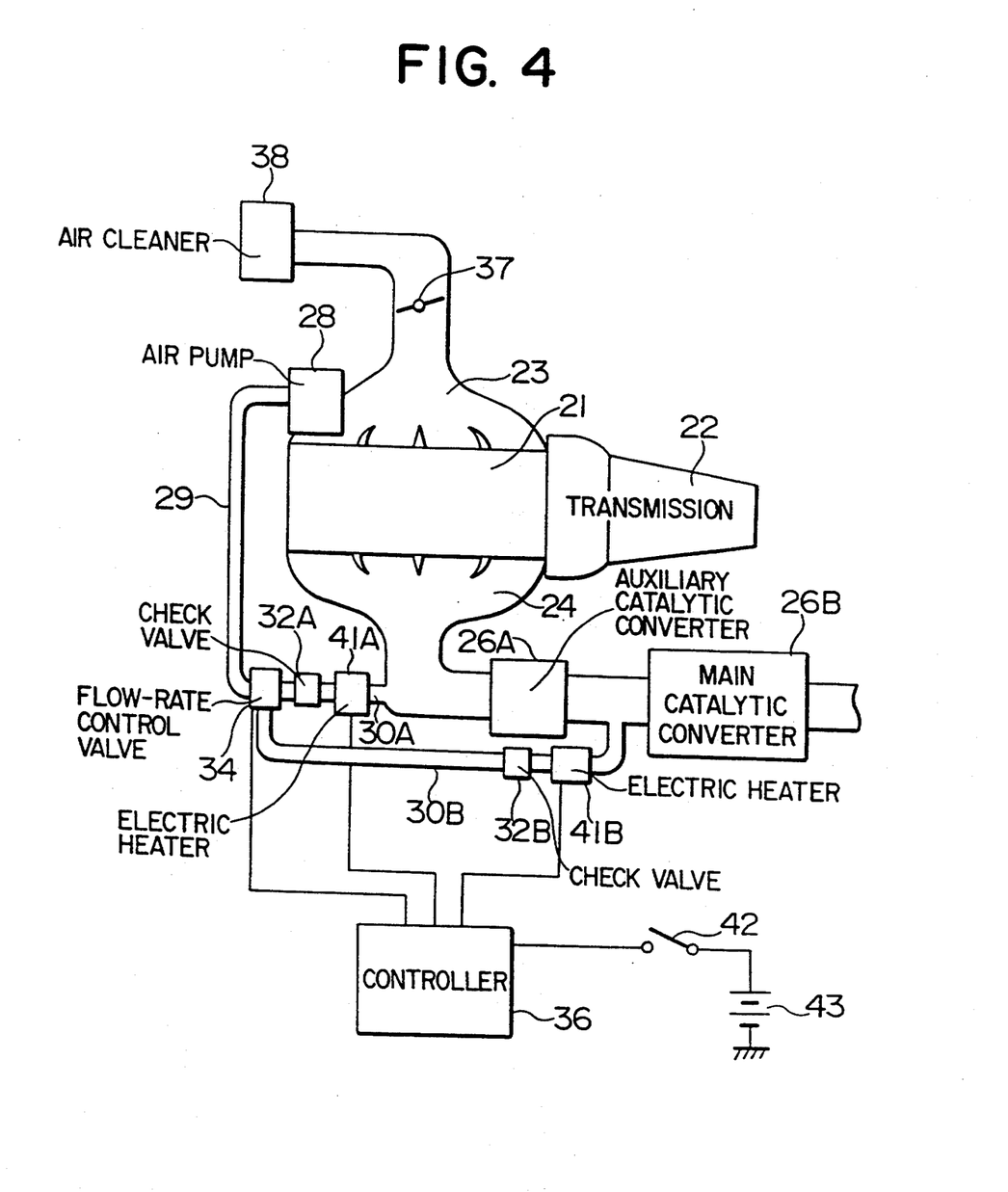
FIG. 4 is a diagram showing schematically a configuration of an internal combustion engine system which is equipped with an air introduction control apparatus for controlling fresh air flow introduced to an exhaust pipe system according to a fourth embodiment of the invention.
Figure 5:
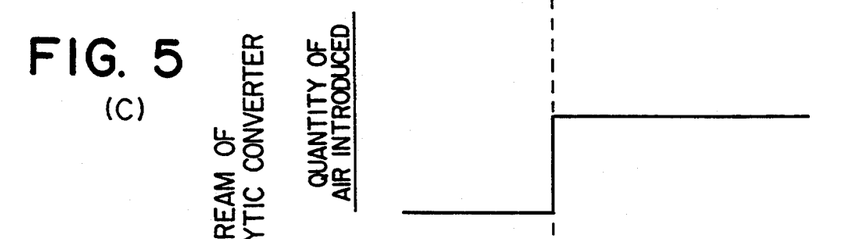
FIG. 5(A) through 5(D) is a view for graphically illustrating operation of the air introduction control apparatus shown in FIG. 4.

FIG. 4 shows schematically a configuration of an internal combustion engine system equipped with an apparatus for controlling the quantity of fresh air introduced to an exhaust gas purification/discharge system according to a fourth embodiment of the invention. Referring to the figure, an internal combustion engine 21 is provided with a intake pipe 23 for charging air into the engine 21, the intake pipe 23 having an inlet port connected to an air cleaner 38 which serves for screening out the dusts from the air introduced into the intake pipe 23. Mounted within the intake pipe 23 is a throttle valve 37 for regulating the quantity of air flow charged into the engine 21. An exhaust pipe 24 connected to the engine 21 serves to transport the exhaust gas discharged from the engine 21 to an auxiliary catalytic converter 26A and a main catalytic converter 26B which are disposed serially in this order as viewed in the flow direction for purifying the exhaust gas through catalytic chemical reaction. The intake pipe 23 is connected to the exhaust pipe 24 at both locations upstream of the auxiliary catalytic converter 26A and the main catalytic converter 26B, respectively, by way of a shunt pipe 29 and air feed pipes 30A and 30B for introducing the fresh air into the exhaust pipe 24 from the intake pipe 23. In this conjunction, an air pump 28 is installed in the shunt pipe 29 for feeding under pressure the air having passed through the air cleaner 38 into the shunt pipe 29. Disposed in the air feed pipes 30A and 30B at positions upstream of the exhaust pipe 24 are check valves 32A and 32B, respectively, which function to prevent the exhaust gas from flowing backwardly from the exhaust pipe 24 toward the intake pipe 23. A transmission 22 is operatively coupled to the engine 21. The auxiliary catalytic converter 26A is usually of a smaller capacity than that of the main catalytic converter 26B so that the former can be activated earlier than the latter.

Further provided at a branching point of the air feed pipes 30A and 30B is a control valve 34 which is placed under the control of the control unit 36. On the other hand, an electric heater 41A is installed in the air feed pipe 30A between the check valve 32A and the auxiliary catalytic converter 26A, while an electric heater 41B is installed in the air feed pipe 30B between the check valve 32B and the main catalytic converter 26B. The control valve 34 and the electric heaters 41A; 41B are electrically connected to the control unit 36 which in turn is connected to an onboard battery 43 by way of a starter switch 42 of the internal combustion engine 21. Upon closing of the switch 42, the electric heaters 41A and 41B are electrically energized under the control of the control unit 36, and at the same time the control valve 34 is so controlled as to regulate or control the quantity of fresh air to be admixed to the engine exhaust gas and at the same time to control the quantity of fresh air to be fed through the fresh air feeding pipes 30A and 30B, respectively.

Next, description will turn to operation of the internal combustion engine system according to the instant embodiment. Upon closing of the starter switch 42, the internal combustion engine 21 starts to run, while the control unit 36 responds to the on-signal of the switch 42 to thereby activate the electric heater 41A located upstream of the auxiliary catalytic converter 26A and the control valve 34 in such manners as illustrated graphically in FIG. 5(A) and 5(B), respectively. On the other hand, the air pump 28 starts to operate in synchronism with the running of the internal combustion engine 21 to tap the fresh air from the intake pipe 28 into the shunt pipe 29. Thus, the fresh air is fed to the exhaust pipe 24 via the check valve 32A and the electric heater 41A for a given period $T_1$ under the control of the control valve 34. Upon lapse of the given period $T_1$, the control unit 39 electrically energizes the electric heater 41B disposed upstream of the main catalytic converter 26B while controlling the control valve 34, as is graphically illustrated in FIG. 5(C) and (D), respectively. More specifically, the control valve 34 is so controlled as to decrease or maintain the air flow through the air feed pipe 30 and the auxiliary catalytic converter 26A while increasing the air flow through the main catalytic converter 26B to thereby allow the heated air to flow through both the auxiliary catalytic converter 26A and the main catalytic converter 26B, as a result of which the catalytic reaction efficiency as a whole is significantly enhanced. Parenthetically, it should be noted that the above-mentioned period $T_1$, the air flows through the auxiliary catalytic converter 26A and the main catalytic converter 26B, respectively, and the capacities of the electric heaters 41A and 41B are selected appropriately by taking into consideration the catalyst as actually employed and the temperature of the engine exhaust gas.

Although it has been described that electrical energization of the heater 41B disposed upstream of the main catalytic converter 26B is effectuated at the same time as the fresh air is fed to the main catalytic converter 26B, it should be understood that the electric heater 41B may be energized before the lapse of the period $T_1$ from the start of the engine and the air pump.

As will be appreciated from the foregoing description, according to the teaching of the invention incarnated in the instant embodiment, the air heated by the electric heater 41A is introduced to the auxiliary catalytic converter 26A for the given period $T_1$ from the start of operation of the engine 21, which is followed by supply of a greater quantity of air to the main catalytic converter 26B than that fed to the auxiliary catalytic converter 26A after lapse of the given period $T_1$. Thus, the catalytic converters 26A and 26B can be activated at early stage of engine operation, whereby purification of the exhaust gas can be carried out with a high efficiency. Besides, cost involved in hardware implementation can be suppressed to a minimum.

Embodiment 5

Figure 6:
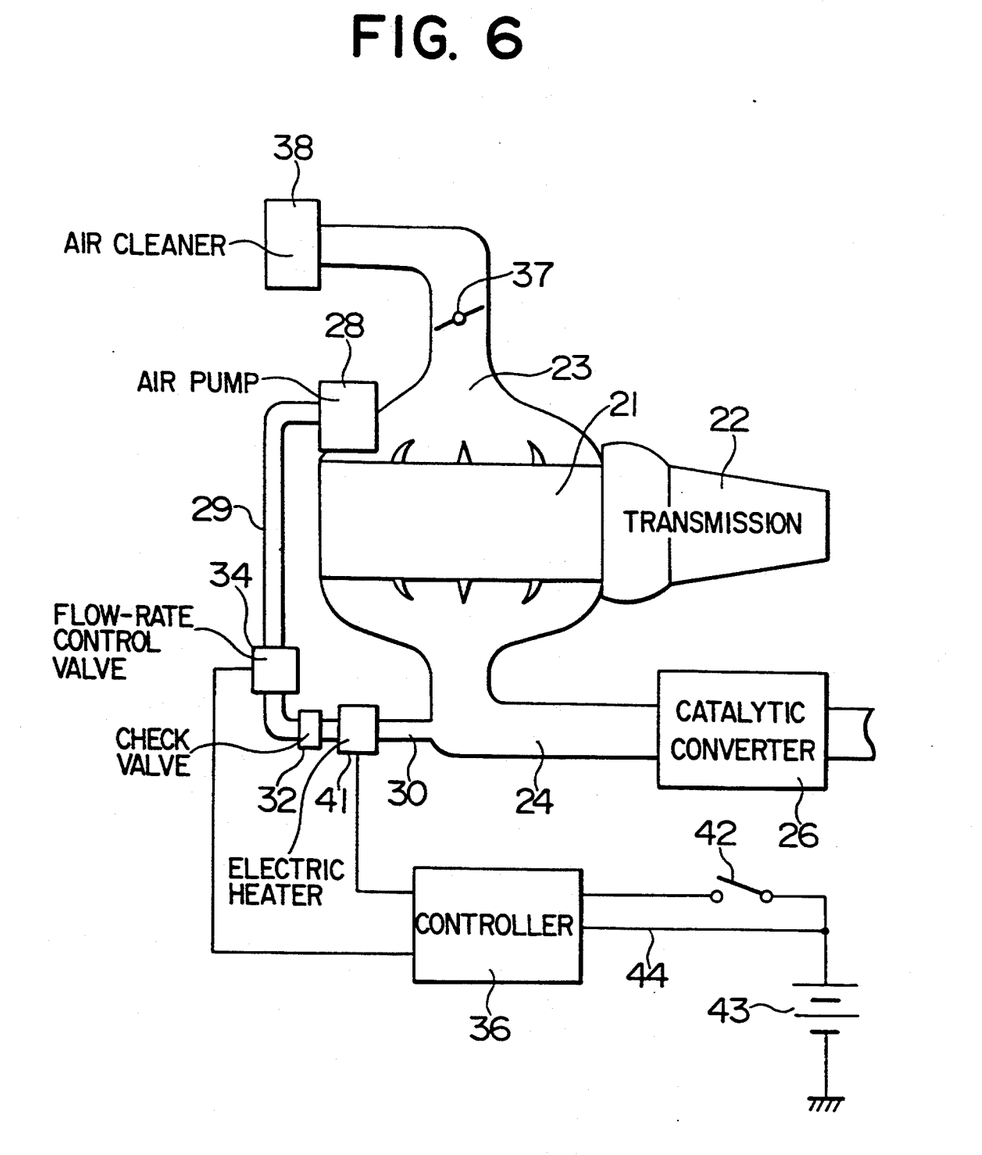
FIG. 6 is diagram showing schematically and generally a structure of an internal combustion engine system which is equipped with an apparatus for controlling introduction of fresh air to an exhaust pipe system according to a third embodiment of the invention.

FIG. 6 shows schematically and generally a structure of an internal combustion engine system which is equipped with an apparatus for controlling the quantity of air to be introduced into an exhaust pipe according to a third embodiment of the invention. Referring to the figure, an internal combustion engine 21 is provided with an air intake pipe 23 for charging air into the engine 21, the intake pipe 23 having an inlet port connected to an air cleaner 38. Mounted within the intake pipe 23 is a throttle valve 37 for regulating the flow of the air charged into the engine 21. An exhaust pipe 24 connected to the engine 21 transports the exhaust gas discharged from the engine 21 to a catalytic converter 26. The intake pipe 23 is communicated to the exhaust pipe 24 at a location upstream of the catalytic converter 26 by way of a shunt pipe 29 and an air feed pipe 30 for introducing the fresh air into the exhaust pipe 24 from the intake pipe 23. An air pump 28 is installed in the shunt pipe 29 for feeding under pressure the air having passed through the air cleaner 38 into the shunt pipe 29. Disposed in the fresh air feed pipe 30 at a position upstream of the exhaust pipe 24 is a check valve 32 which functions to prevent the backward flow of engine exhaust gas. A transmission 22 is coupled to an output shaft of the engine 21.

Further, a control valve 34 is installed in the shunt pipe 29 at a position upstream of the check valve 32. An electric heater 41 is installed in the air feed pipe 30 at a position downstream of the check valve 32.

Figure 7A:
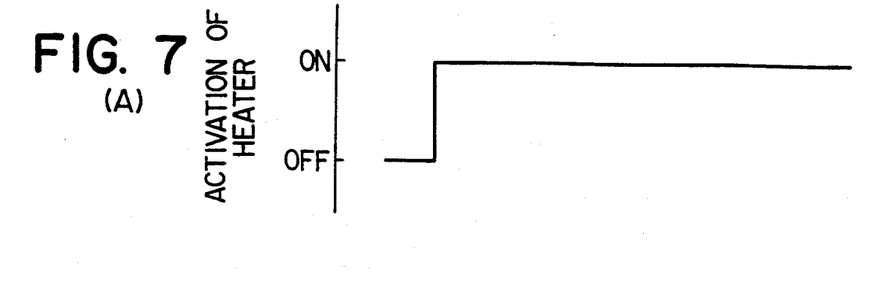
FIG. 7(A) through 7(C) is a view for graphically illustrating actuation of an electric heater, heater characteristics and amounts of air introduced to an exhaust gas pipe in the system shown in FIG. 6.

The control valve 34 and the electric heater 41 are electrically connected to a control unit 36, which in turn is electrically connected to an onboard battery 43 via a starter switch 42 of the internal combustion engine 21 so as to receive a battery voltage signal 44 from the battery 43. More specifically, in response to the closing of the starter switch 42, the control unit 36 electrically energizes the heater 41, i.e., at the same time as the engine 21 starts to run, as is illustrated in FIG. 7(A). Further, on the basis of the battery voltage signal 44, the control unit 36 determines the output voltage state or level of the battery 43 to start the operation of the control valve 34 after lapse of a period $T_1$ or $T_2$ after the start of the engine operation in dependence on the output voltage level of the battery 43 for allowing the air tapped from the intake manifold 23 to flow through the heater 41 whose temperature is risen. Thus, the fresh air is heated before reaching the exhaust pipe 24.

Figure 7B:
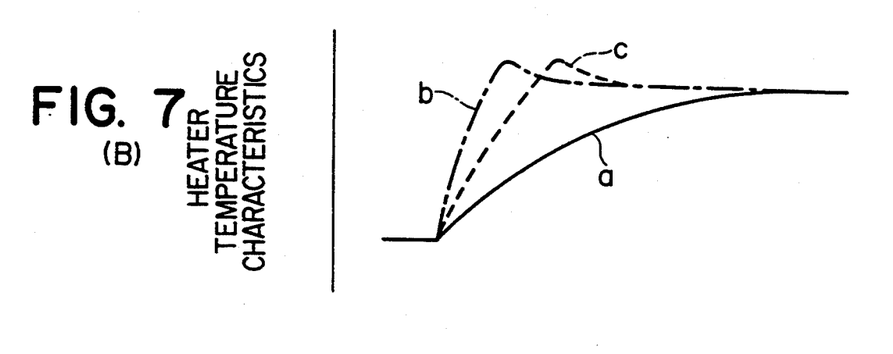
Figure 7C:
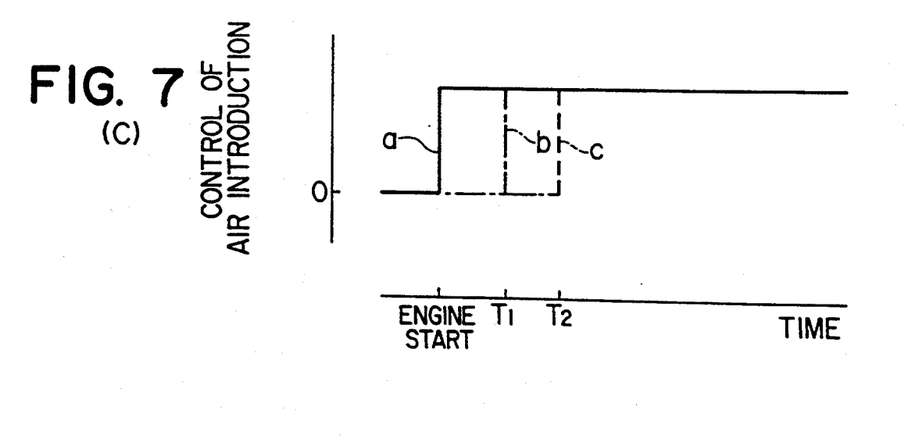

More specifically, referring to FIG. 7(A)–7(C), it is assumed that the heater 41 is electrically energized at the same time as the engine 21 starts to run. In that case, the air is fed to the exhaust pipe 24 under the control of the control unit 36 at a time point indicated by a rise-up curve a in FIG. 7(C), and thus the air is heated by the heater 41 whose temperature rises in a manner indicated by a curve a shown in FIG. 7(B). On the other hand, when the fresh air is fed to the exhaust system 24 of the engine 21 after lapse of the period $T_1$ from the start of the engine 21 as indicated by a curve b in FIG. 7(C), the air is heated by the heater 41 whose temperature rises in a manner indicated by a curve b shown in FIG. 7(B). Further, when the fresh air feeding to the exhaust system is started after lapse of the period $T_2$ from the engine start as indicated by a curve c in FIG. 7(C), the air is heated by the heater 41 whose temperature rises in a manner indicated by a curve c in FIG. 7(B). In this conjunction, the heater temperature characteristics b and c shown in FIG. 7(B) can be determined on the basis of the output voltage level of the battery and correspond to high and low levels, respectively. Accordingly, when the battery voltage level as detected indicates the temperature characteristic b, the fresh air feeding may be started after lapse of the period $T_1$ from the start of electrical energization of the heater 41, while for the battery level indicating the characteristic c, the air feeding may be started after lapse of the period $T_2$.

In operation, when the starter switch 42 is closed, the internal combustion engine 21 starts to run with the control unit 36 and the heater 41 being activated in response to the turn-on signal of the starter switch 42. The control unit 36 determines the output voltage level of the battery 43 on the basis of the battery voltage signal 44 to thereby set actuation of the control valve 34 at a time point corresponding to the time lapse $T_1$ or $T_2$ so that the control valve 34 is opened after lapse of the period $T_1$ or $T_2$ from the start of the engine operation. On the other hand, the air pump 28 is started simultaneously with the start of the engine operation to thereby feed the fresh air to the control valve 34 through the shunt pipe 29 in a quantity proportional to the rotation speed (rpm) of the engine. After lapse of the period $T_1$ or $T_2$ from the start of engine operation, the control valve 34 is activated to allow the fresh air as introduced to pass through the heater 41 which has adequately been heated during the period $T_1$ or $T_2$, as indicated by the curve b or c shown in FIG. 7 at (B). The heated air is admixed to the engine exhaust gas within the exhaust pipe 24 and undergoes reaction with carbon monoxide and hydrocarbon contained in the exhaust gas within the catalytic converter 26. Thus, purification of the exhaust gas can be realized at a high rate or efficiency.

In a modification of the instant embodiment, the battery terminal voltage supplied to the controller 36 may be replaced by a voltage detected at the controller 36 to substantially same effect. Further, the quantity of the air to be fed to the exhaust system may be controlled by the air pump itself instead of the control valve 34, which may then be spared to advantage.

As can be understood from the above description, with the instant embodiment of the invention in which the timing for introducing the air to the engine exhaust system is determined appropriately on the basis of the output voltage state of the battery 43, it is possible to heat the air as introduced by the heater 41 which has already been heated adequately, whereby the catalyst can be activated at earlier stage to effectuate the purification of the exhaust gas with high efficiency. The cost involved in implementing hardware to this end can be suppressed to a minimum.

Many features and advantages of the present invention are apparent form the detailed specification and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. For example, features of the various embodiments described above may be combined to improve further the control of the air introduction to the exhaust system. Accordingly, all suitable modifications and equivalents may be resorted to, falling within the spirit and scope of the invention.

We claim:

1. In an internal combustion engine equipped with an intake pipe and an exhaust gas purification/discharge system including an exhaust pipe and a catalytic converter installed in said exhaust pipe for purification of engine exhaust gas, an apparatus for controlling the introduction of air into said exhaust gas purification/discharge system to improve the efficiency of purification of exhaust gases, comprising:

an air feed pipe having an inlet port and an outlet port which is connected to said exhaust pipe at a position upstream of said catalytic converter;

electrically controllable valve means installed in said air feed pipe at a position downstream of said inlet port for controlling air flow fed to said exhaust gas purification/discharge system;

electrical heater means disposed in said air feed pipe at a position downstream of said electrically controllable valve means and upstream of said catalytic converter;

power supply means for supplying electric power required for operation at least of said engine, said valve means and said heater means;

voltage level detector means for detecting an output voltage level of said power supply means; and control means electrically connected to said power supply means, said valve means, said electric heater means and said voltage level detecting means for electrically energizing said heater means upon a start of operation of said engine and for simultaneously controlling a timing of operation of said valve means to feed air to said exhaust gas purification/discharge system via said electric heater means in dependence upon the output voltage level of said power supply means as detected by said detector means.

2. An air introduction control apparatus according to claim 1, wherein control of said control means is performed such that a time span intervening between energization of said heater and actuation of said valve means is increased when the output voltage level of said power supply means is low.

* * * * *